US010983297B2

(12) United States Patent
Fallahmohammadi et al.

(10) Patent No.: US 10,983,297 B2
(45) Date of Patent: Apr. 20, 2021

(54) OPTICAL FIBER RIBBON AND A METHOD OF PRODUCING THE SAME

(71) Applicant: Prysmian S.p.A., Milan (IT)

(72) Inventors: Ehsan Fallahmohammadi, Columbia, SC (US); John R. Sach, Chapin, SC (US); Donald Ray Parris, Lomagna (IT); Ben H. Wells, Columbia, SC (US)

(73) Assignee: Prysmian S.p.A., Milan (IT)

( * ) Notice: Subject to any disclaimer, the term of this patent is extended or adjusted under 35 U.S.C. 154(b) by 0 days.

(21) Appl. No.: 16/629,732

(22) PCT Filed: Jul. 11, 2017

(86) PCT No.: PCT/EP2017/067454
§ 371 (c)(1),
(2) Date: Jan. 9, 2020

(87) PCT Pub. No.: WO2019/011417
PCT Pub. Date: Jan. 17, 2019

(65) Prior Publication Data
US 2020/0271879 A1    Aug. 27, 2020

(51) Int. Cl.
*G02B 6/44* (2006.01)
(52) U.S. Cl.
CPC .................... *G02B 6/448* (2013.01)
(58) Field of Classification Search
CPC ............... G02B 6/4403; G02B 6/448
See application file for complete search history.

(56) References Cited

U.S. PATENT DOCUMENTS

| 5,682,454 A | 10/1997 | Gaillard |
| 5,720,908 A | 2/1998 | Gaillard |
| 6,381,390 B1 | 4/2002 | Hutton et al. |

(Continued)

FOREIGN PATENT DOCUMENTS

| EP | 1043613 A1 | 10/2000 |
| EP | 2770357 A1 | 8/2014 |

(Continued)

OTHER PUBLICATIONS

International Search Report in counterpart International Application No. PCT/EP2017/067454 dated Apr. 3, 2018, pp. 1-3.

(Continued)

*Primary Examiner* — Omar R Rojas
(74) *Attorney, Agent, or Firm* — Additon, Pendleton & Witherspoon, P.A.

(57) ABSTRACT

The present invention relates to an optical fiber ribbon, comprising a plurality of adjacent optical fiber units extending in a longitudinal direction and arranged in parallel forming an optical fiber assembly having a width, each of the optical fiber units comprising either a single fiber or a group of at most three optical fibers, preferably two optical fibers, encapsulated with a matrix material; and a plurality of successive elongated rectilinear beads of a bonding material being arranged along a length of said assembly; each of said plurality of beads being configured to form an elongated bond between two adjacent optical fiber units of the plurality of optical fiber units; wherein a first bead forming a first bond connects a first pair of adjacent optical fiber units while the successive bond formed by the successive bead, connects a further pair of adjacent optical fiber units, wherein at least one optical fiber unit of the further pair differs from the optical fiber units of the first pair; wherein at each longitudinal position of the optical fiber assembly there is at most one bond. The present invention moreover relates to a method of producing such an optical fiber ribbon.

20 Claims, 4 Drawing Sheets

(56) References Cited

U.S. PATENT DOCUMENTS

| | | |
|---|---|---|
| 7,623,747 B2 | 11/2009 | de Montmorillon et al. |
| 7,889,960 B2 | 2/2011 | de Montmorillon et al. |
| 8,145,025 B2 | 3/2012 | de Montmorillon et al. |
| 8,265,442 B2 | 9/2012 | Overton |
| 8,600,206 B2 | 12/2013 | Overton |
| 9,086,555 B2 | 7/2015 | Namazue et al. |
| 9,389,386 B2 | 7/2016 | Matsuzawa et al. |
| 9,541,722 B2 | 1/2017 | Sajima et al. |
| 10,185,105 B2 | 1/2019 | Risch et al. |
| 2003/0118301 A1 | 6/2003 | Hurley et al. |
| 2010/0254658 A1 | 10/2010 | Tanaka et al. |
| 2011/0058779 A1 | 3/2011 | Wells et al. |
| 2011/0110635 A1 | 5/2011 | Toge et al. |
| 2013/0156390 A1 | 6/2013 | Matsuzawa et al. |
| 2016/0161692 A1 | 6/2016 | Namazue et al. |
| 2016/0299310 A1 | 10/2016 | Kaneko et al. |
| 2016/0356976 A1 | 12/2016 | Sajima et al. |
| 2017/0115461 A1 | 4/2017 | Namazue et al. |
| 2017/0184803 A1 | 6/2017 | Namazue et al. |
| 2017/0219792 A1 | 8/2017 | Debban et al. |
| 2018/0031792 A1 | 2/2018 | Risch et al. |
| 2018/0320003 A1 | 11/2018 | Chen |
| 2018/0371298 A1 | 12/2018 | Schmid et al. |
| 2019/0250347 A1 | 8/2019 | Fallahmohammadi et al. |

FOREIGN PATENT DOCUMENTS

| | | |
|---|---|---|
| FR | 2693560 A1 | 1/1994 |
| JP | 2003-232972 A | 8/2003 |
| JP | 2010-44336 A | 2/2010 |
| JP | 2011-221199 A | 11/2011 |
| JP | 2012-027130 A1 | 2/2012 |
| JP | 2012-103341 A | 5/2012 |
| JP | 2014-010439 A | 1/2014 |
| JP | 2015-021734 A | 2/2015 |
| JP | 2015-108756 A1 | 6/2015 |
| JP | 2016-075746 A | 5/2016 |
| JP | 2017-134360 A | 8/2017 |
| JP | 2015-108756 A | 10/2017 |
| JP | 2017-181513 A | 10/2017 |
| RU | 2619397 C1 | 5/2017 |
| WO | 2012/023508 A1 | 2/2012 |
| WO | 2012/165371 A1 | 12/2012 |
| WO | 2019/011417 A1 | 1/2019 |
| WO | 2019/011418 A1 | 1/2019 |
| WO | 2019/137627 A1 | 7/2019 |
| WO | 2019/137628 A1 | 7/2019 |

OTHER PUBLICATIONS

LOCTITE Technical Data Sheet, "Loctite 3341", www.henkel.com/industrial, Oct. 2005, pp. 1-4.

DSM Product Data Sheet, "Cableite 9D9-287", Mar. 2007, www.dsmdesotech.com, pp. 1-2.

DSM Product Data Sheet, "Cableite 9D9-464", (no date) pp. 1.

DSM Product Data Sheet, "Cableite 9D9-518", Mar. 2007, Elgin, IL, pp. 1-3.

LOCTITE Technical Data Sheet, "Loctite SI 5240", www.henkel.com/industrial, Jan. 2015, pp. 1-4.

OPTICAL FIBER RIBBON AND A METHOD OF PRODUCING THE SAME

TECHNICAL FIELD

The present invention relates to an optical fiber ribbon and to a method of producing the same.

BACKGROUND

The amount of data that is transmitted over optical fiber cables is continuously increasing. This increase is specifically eminent in data centers all over the world—e.g. due to expanding of cloud computing—in which all data has to be transmitted in a limited space. This causes an increasing demand for high-fiber-count and high fiber-density optical cables. Moreover, there is always a tendency to reduce the construction cost of the access cable network, making it important to reduce the diameter and weight of the optical cable. By decreasing optical cable diameter and weight it will be possible to use existing facilities such as underground ducts, which will reduce installation cost. An additional requirement is that in order to shorten the operation time of cable connection, the optical fibers should be mass fusion spliced.

This means that there are several—possibly conflicting—demands, being on the one hand decrease in optical cable diameter and on the other hand increasing the optical fiber density. This is serious challenge for optical cable manufactures.

In order to obtain easy workability, optical fiber ribbons have been used that can be mass fusion spliced for making multiple optical fiber connections at once with improved flexibility.

Standard optical fiber ribbons however have the disadvantage of being rigid because there is a layer of resin applied around the optical fiber assembly in order to keep the optical fibers in a parallel plane. This rigidity limits the possibility to increase the fiber density in optical fiber cables.

JP2011221199 has proposed an option to provide more flexible optical fiber ribbon by applying a sine-shaped line of matrix bonding material to one side of an parallel assembly of adjacent optical fibers.

SUMMARY

It is an object of the present invention to provide an optical ribbon having improved flexibility and allows for rolling or folding of the optical fibers in a ribbon width direction. It is another object of the present invention to provide an optical ribbon that can be mass fusion spliced for making multiple optical fiber connections. It is a further object of the present invention to provide an optical fiber ribbon from which individual optical fibers, or, fiber units comprising at most three optical fibers encapsulated with a matrix material, can be separated without damaging adjacent optical fibers.

One or more of these objects are achieved by an optical fiber ribbon, comprising: i) a plurality of adjacent optical fiber units extending in a longitudinal direction and arranged in parallel forming an optical fiber assembly having a width, each of the optical fiber units comprising either a single optical fiber or a group of at most three optical fibers, preferably two optical fibers, encapsulated with a matrix material; and ii) a plurality of successive elongated rectilinear beads of a bonding material being arranged along a length of said assembly; each of said plurality of beads being configured to form an elongated bond between two adjacent optical fiber units of the plurality of optical fiber units; wherein a first bead forming a first bond connects a first pair of adjacent optical fiber units while the successive bond formed by the successive bead connects a further pair of adjacent optical fiber units, wherein at least one optical fiber unit of the further pair differs from the optical fiber units of the first pair; wherein at each longitudinal position of the optical fiber assembly there is at most one bond.

In an aspect, the invention relates to a method of producing an optical fiber ribbon, said method comprising *feeding a plurality of optical fiber units to provide a longitudinal optical fiber assembly having a width; wherein the plurality of optical fiber units are in parallel and adjacent to each other, each of the optical fiber units comprising either a single optical fiber or a group of at most three optical fibers, preferably two optical fibers, encapsulated with a matrix material; *applying a bonding material from a dispenser to a surface of said assembly wherein the bonding material forms a plurality of successive elongated rectilinear beads being configured to form bonds; wherein—each of said plurality of beads being configured to form an elongated bond between two adjacent optical fiber units of the plurality of optical fiber units; wherein said bond connects a first pair of adjacent optical fiber units while the successive bond thereof, formed by the successive one of said plurality of beads, connects a further pair of adjacent optical fiber units, at least one optical fiber unit of the further pair differs from the optical fiber units of the first pair, and—wherein the bonding material is applied in such a manner that at each longitudinal position of the optical fiber assembly there is at most one bond.

Corresponding embodiments of the ribbon disclosed below are also applicable for the method according to the present invention and vice versa.

The optical fiber ribbon according to the present invention thus has multiple optical fiber units arranged in parallel, and intermittently connected with another optical fiber unit. A connection is created by a bonding material on one side of the ribbon forming beads at the interstices (also called grooves) of the connected fiber units. The inventive ribbon is very flexible and it is therefore also effective for dense packing of the optical fiber ribbons within an optical fiber cable to give a high fiber density. The ribbon can be spliced at once with mass fusion splicing and individual optical fiber units can be separated from the ribbon easily.

LIST OF DEFINITIONS

The following definitions are used in the present description and claims to define the stated subject matter. Other terms not cited below are meant to have the generally accepted meaning in the field.

optical fiber assembly as used in the present description means: a loose arrangement of the plurality of parallel adjacent optical fibers without any bonding between any of the fibers;

assembly width (W) or width (W) as used in the present description means: said assembly is formed of a number (N) of optical fiber units each having a unit width (w) and a length (L); said assembly having a width (W; W=w×N). In case that the optical fiber units comprise a single fiber, the unit with equals the fiber diameter (D) so that W=D×N;

bond as used in the present description means: a bead of bonding material that bonds two adjacent optical fiber units over a bonding length (l). It should be noted that if two (or more) subsequent beads are applied after another within the same groove connecting the same two adjacent optical fiber units these two (or more) beads are considered to form a bond together with a bonding length (l) equal to the sum of the length of such subsequent beads;

stepwise pattern as used in the present invention means a pattern constituted by a succession of beads over the plurality of optical fiber units wherein the beads of said succession of beads are each time spaced apart at a distance of one optical fiber unit, in the width direction. That means, the step of the stepwise pattern is one optical fiber unit. Thus, in case that the assembly would be formed by a number of N optical fiber units, an individual stepwise pattern is constituted by a succession of (N−1) beads;

zig-zag like arrangement as used in the present description means an arrangement following the trace of a triangle wave. The zig-zag like arrangement in the present application is obtained by fitting a line through mid-points of the subsequent beads of subsequent stepwise patterns;

saw-tooth like arrangement as used in the present description means an arrangement following the trace of a saw-tooth wave. The saw-tooth like arrangement in the present application is obtained by fitting a line through mid-points of the subsequent beads of subsequent stepwise patterns;

a pitch (P) as used in the present description is defined as having a length equal to the recurrence of the stepwise pattern in the same width direction.

BRIEF DESCRIPTION OF DRAWINGS

The present invention is described hereinafter with reference to the accompanying schematic drawings in which embodiments of the present invention are shown and in which like reference numbers indicate the same or similar elements.

FIG. 2b shows an embodiment of an inventive optical fiber ribbon having an intermittent/discontinuous zig-zag like arrangement with a different bonding length than the embodiment of FIG. 2a.

DESCRIPTION OF EMBODIMENTS

As described above, in a first aspect the invention relates to a ribbon. Several embodiments of said ribbon are discussed below.

Figure 1:
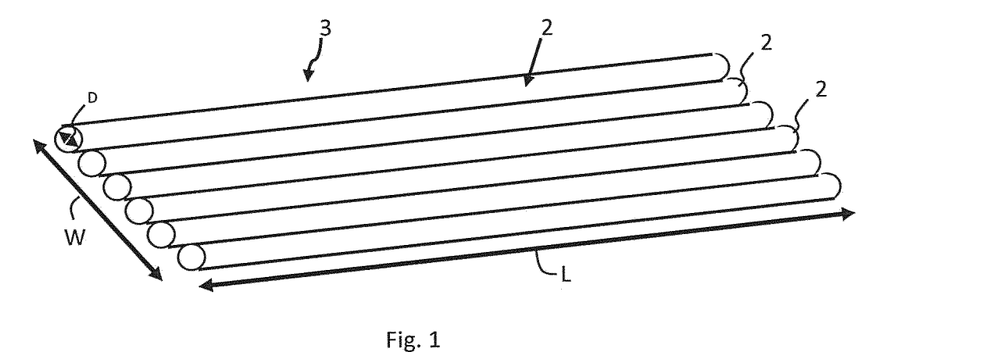
FIG. 1 shows an optical fiber assembly (not part of the invention) in 3-dimensional view.

FIG. 1 discloses a plurality of adjacent optical fibers 2 having a diameter D and arranged in parallel forming a longitudinal optical fiber assembly 3 said assembly 3 having a width W and a length L. This assembly forms the basis for the optical fiber ribbon according to the present invention.

The invention relates to an optical fiber ribbon 100-700, comprising
  a plurality of adjacent optical fiber units 5, 105 extending in a longitudinal direction and arranged in parallel forming an optical fiber assembly 3 having a width W, each of the optical fiber units 5, 105 comprising either a single optical fiber 2 or a group of at most three optical fibers 2, preferably two optical fibers, encapsulated with a matrix material 8; and
  a plurality of successive elongated rectilinear beads 4 of a bonding material being arranged along a length of said assembly;
    each of said plurality of beads 4 being configured to form an elongated bond between two adjacent optical fiber units 5, 105 of the plurality of optical fiber units; wherein a first bead 4 forming a first bond connects a first pair of adjacent optical fiber units 5, 105 while the successive bond formed by the successive bead connects a further pair of adjacent optical fiber units, wherein at least one optical fiber unit of the further pair differs from the optical fiber units of the first pair;
    wherein at each longitudinal position of the optical fiber assembly there is at most one bond.

Figure 12:
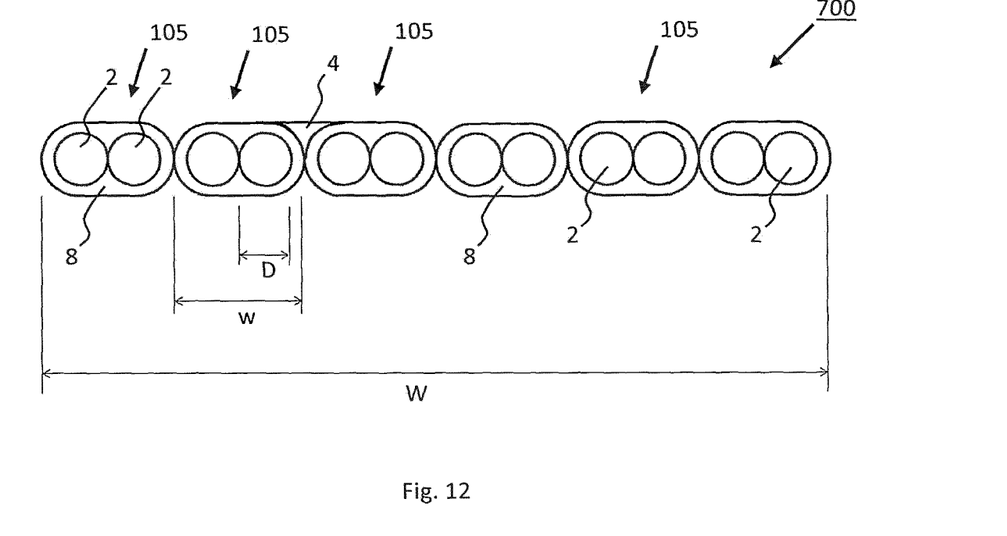
FIG. 12 shows, in cross-sectional view, an embodiment of an inventive optical fiber ribbon having fiber units formed by a group of two fibers.

In the examples according to FIGS. 2a-6, the optical fiber units 5 each comprise a single fiber 2, while in the example according to FIG. 12, the optical fiber units 105 each comprise two optical fibers 2.

Several specific embodiments of said optical fiber ribbon are discussed below and disclosed in the drawings and each of these is discussed separately below.

In an embodiment, each of the optical fiber units comprises a group of at most three optical fibers, preferably two optical fibers, encapsulated with a matrix material. This embodiment, compared to ribbons according to the present invention wherein each optical fiber unit comprises a single optical fiber allow the ribbons to have a more flat state and allows easier mass fusion splicing. In an embodiment, the ribbon according to the present invention comprises six optical fiber units, each comprising two optical fibers, in total leading to a 12-optical fiber ribbon.

In an embodiment, a bond has a bonding length (l) and bonds are spaced apart in longitudinal direction by a distance (d). In this embodiment, the bonding length is larger than the distance (l>d). The effect thereof is that the mechanical properties in terms of robustness are increased; a larger mechanical bond between the fibres is achieved.

In an embodiment, the bonding length is between 2 and 20 times the distance ((2d≤l≤20d or l/d=2 to 20). The values of 2 and 20 are included. In an embodiment, the bonding length is between 4 and 15 times the distance (4d≤l≤15d or l/d=4 to 15). The values of 4 and 15 are included. The bead as applied has an elongated form. It will flow into the groove between two adjacent optical fibers or—if the fiber unit comprises two or three fibers—two or three adjacent grouped optical fibers. The elongated beads forming a bond may have a width seen in plan view of between 75 and 350 micrometre, e.g. between 200 and 275 micrometre (viz. of similar dimension as the optical fiber).

In an embodiment, the bonding length (l) of a bead is between 1.5 and 20 mm. the bonding length of the bead is effectively defined by the ratio of bonding length of bonding distance (l/d) and by the ratio of pitch of the stepwise pattern over width of the optical fiber assembly (P/W).

In an embodiment, each of the plurality of optical fibers has substantially the same diameter. In an embodiment, the optical fiber has a diameter of between 240 and 260 micrometer, more preferably 250 micrometer. Alternatively the optical fibers may have a reduced diameter such as between 180 and 230 micrometer. In an embodiment, the optical fiber assembly comprises between 6 and 36 optical fibers (including 6 and 36), such as between 12 and 24 optical fibers (including 12 and 24), for example 12 optical fibers. The fiber units may comprise fibers grouped in pairs as described above. When grouped the optical fiber assembly may comprise 6 to 18 groups of two fibers, such as 6 groups of two fibers, 12 groups of two fibers or 18 groups of two fibers. The fiber units may comprise three fibers, such as four fiber units of three fibers, or five fiber units of three fibers.

In an embodiment, the optical fibers are optical fibers comprising a first and second coating, and optionally an ink layer. A person skilled in the art is aware of the different types of primary coatings, secondary coatings and ink layers and the structure and thickness thereof.

In an embodiment, the beads have been arranged on only one side of said assembly. For example, the beads have been arranged only on the upper surface of said assembly (seen in plan view when the optical fibers of the assembly are arranged in a ribbon like manner and not in a rolled up manner). The assembly could be seen as a ribbon-like assembly defining two side edges, an upper surface and a lower surface. Said upper and lower surfaces are not fully flat, since they are formed of a parallel arrangement of fiber unit structures. The upper and lower surfaces comprises parallel longitudinal grooves between adjacent optical fiber units. The beads are arranged to lie in the grooves formed between the optical fiber units.

In an embodiment, two successive beads of said plurality of beads have been connected by a transition part of said bonding material. In an embodiment, in plan view said transition part is S-shaped. In an embodiment, each two successive beads of said plurality of beads have been connected by a transition part of said bonding material.

In an embodiment, a succession of alternating beads and transition parts forms a thread, wherein at each longitudinal position of the optical fiber assembly there is at most one thread.

In an embodiment, the thread has a mass (in grams) per 10000 meter of between 60 and 120 dtex, preferably between 75 and 110 dtex.

In an embodiment, each two successive beads of said plurality of beads are free from each other in that no bonding material connecting said two beads is present. In other words, there is no thread of resin but merely individual beads.

In an embodiment, a number of successive beads form a stepwise pattern over the plurality of optical fiber units, the step each time being one optical fiber unit.

In an embodiment, each of the optical fiber units comprises a single fiber, that means only one fiber. In another embodiment, each of the optical fiber units comprises a group of two optical fibers encapsulated with a matrix material.

In an embodiment, said matrix material is an acrylate, such as an polyurethane acrylate or a polymethacrylate material. In an embodiment, the encapsulating matrix material has a thickness of between 5 and 10 micrometer.

In a first example of this embodiment with a stepwise pattern, at an end of said stepwise pattern of beads, the bead that follows the last bead of said pattern starts a subsequent stepwise pattern in the same width direction, preferably wherein the successive stepwise patterns are free from each other in that no bonding material connecting said two stepwise patterns is present. This succession of stepwise patterns may be repeated, preferably over the length of the fiber units, thereby forming a saw-tooth-like arrangement over the plurality of fiber units, seen in plan view. In an embodiment of this saw-tooth like arrangement, a pitch (P) is defined having a length equal to the recurrence of the stepwise pattern in the same width direction and wherein the pitch (P) has a length that is between 10 times W and 100 times W, preferably between 15 times W and 80 times W.

Figure 4A:
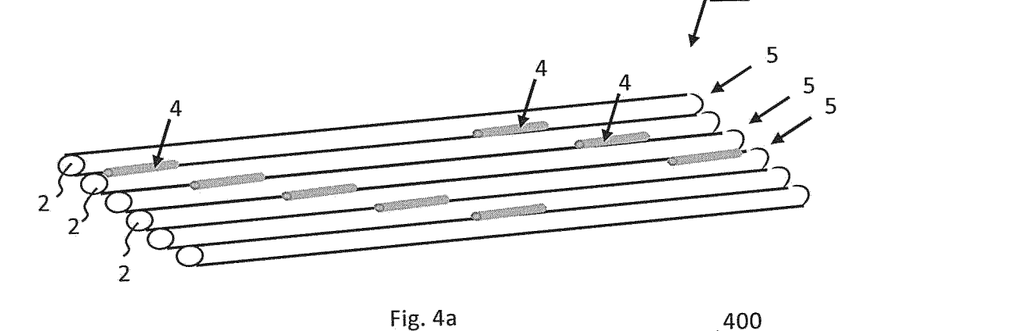
FIG. 4a shows an embodiment of an inventive optical fiber ribbon having an intermittent/discontinuous saw-tooth like arrangement, in 3-dimensional view.
Figure 4B:
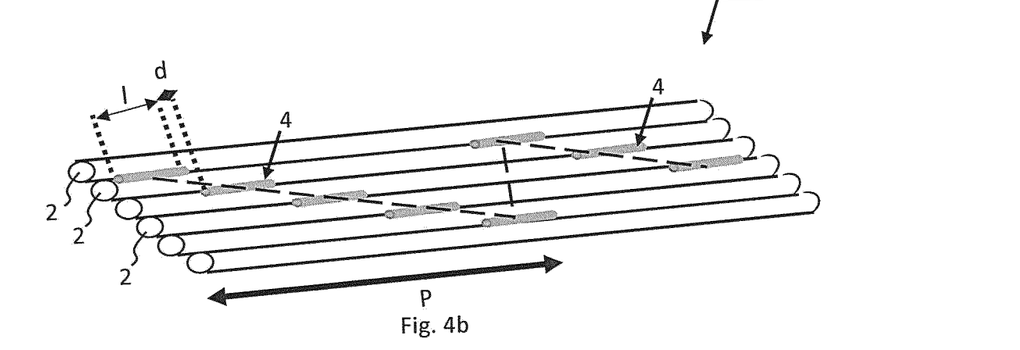
FIG. 4b shows the embodiment of FIG. 4a with a fitted saw-tooth line and pitch.

FIG. 4 (a&b) discloses an embodiment of an optical fiber ribbon 400 having a saw-tooth like arrangement. In this arrangement of FIG. 4 none of the beads 4 are connected and the plurality of beads is arranged as a discontinuous line. The saw-tooth like arrangement has a constant repetition that follows the trace of a saw tooth wave with a pitch (P) (see FIG. 4b).

Figure 5:
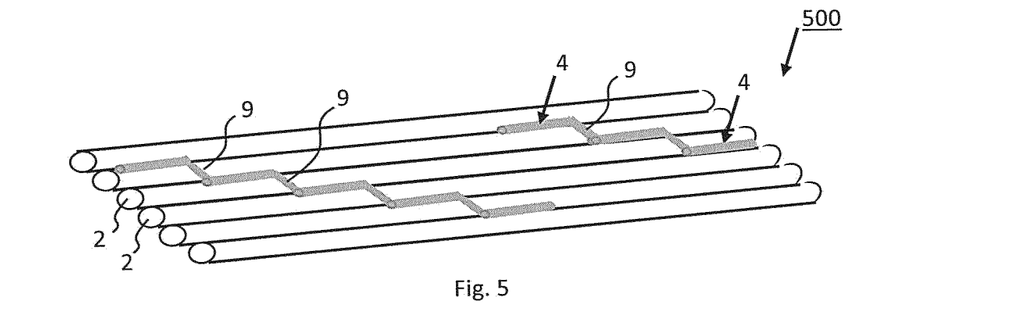
FIG. 5 shows an embodiment of an inventive optical fiber ribbon having an partly continuous saw-tooth like arrangement, in 3-dimensional view.

FIG. 5 discloses an embodiment of an optical fiber ribbon 500 having a saw-tooth like arrangement. The plurality of beads are arranged as a partly continuous line of said bonding material. The continuous line starts with a first bead 4 being applied between the first and second optical fibers 2 seen from the most distant edge. This continuous line continues over the top of said second optical fiber, with a transition part 9, to the groove between the second and third optical fiber, and further on over the top of said third optical fiber, with a transition part 9, to the groove between the third and fourth optical fiber and so on and so on. The continuous line ends in the groove between the fifth and sixth (last) optical fiber. A new continuous lines starts again in the groove between the first and second optical fiber at a distance P of the pitch (shown in FIG. 4) from the first continuous line.

Figure 6:
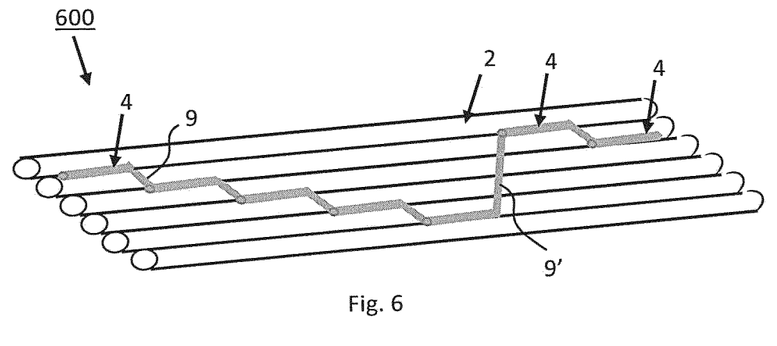
FIG. 6 shows an embodiment of an inventive optical fiber ribbon having an continuous saw-tooth like arrangement, in 3-dimensional view.

FIG. 6 discloses an embodiment of an optical fiber ribbon 600 having a saw-tooth like arrangement. The plurality of beads are arranged as a continuous line of said bonding material. The difference with the embodiment shown in FIG. 5 is that there is also a resin line 9' between the bead 4 between the fifth and sixth optical fiber 2 of the first saw-tooth like arrangement and the bead 4 between the first and the second optical fiber 2 of the second saw-tooth like arrangement. This is a preferred embodiment.

In a second example of the embodiment with a stepwise pattern, a first stepwise pattern has been formed in a first width direction and wherein at the end of said stepwise pattern a further stepwise pattern in the opposite direction has been formed. This succession of stepwise patterns may be repeated, preferably over the length of the fiber units, thereby forming a zigzag-like arrangement over the plurality of fiber units, seen in plan view. The plurality of beads have been provided in such a manner that the plurality of adjacent optical fiber units of the fiber assembly, when the fiber assembly would be brought into a folded-out condition, extend in the same virtual flat plan. In an embodiment of this zig-zag like arrangement, a pitch (P) is defined having a length equal to the recurrence of the stepwise pattern in the same width direction and wherein the pitch (P) has a length that is between 14 times W and 140 times W, preferably between 18 times W and 100 times W.

Figure 2A:
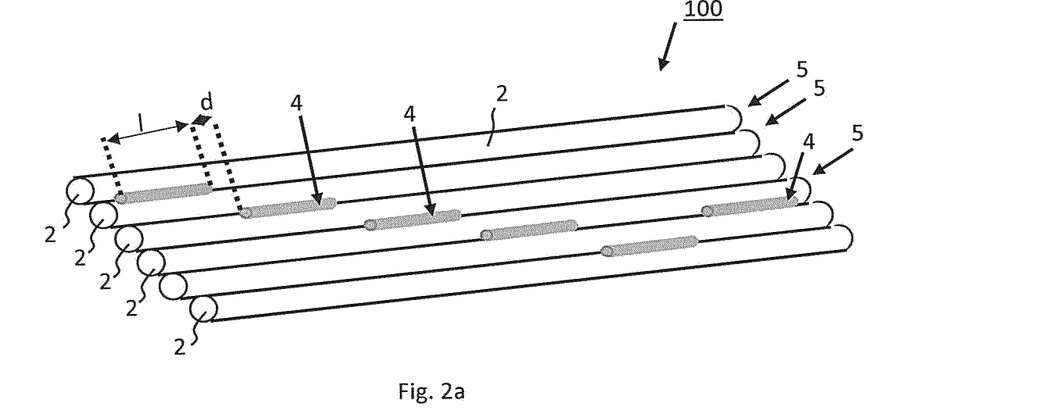
FIG. 2a shows an embodiment of an inventive optical fiber ribbon having an intermittent/discontinuous zig-zag like arrangement, in 3-dimensional view.
Figure 2B:
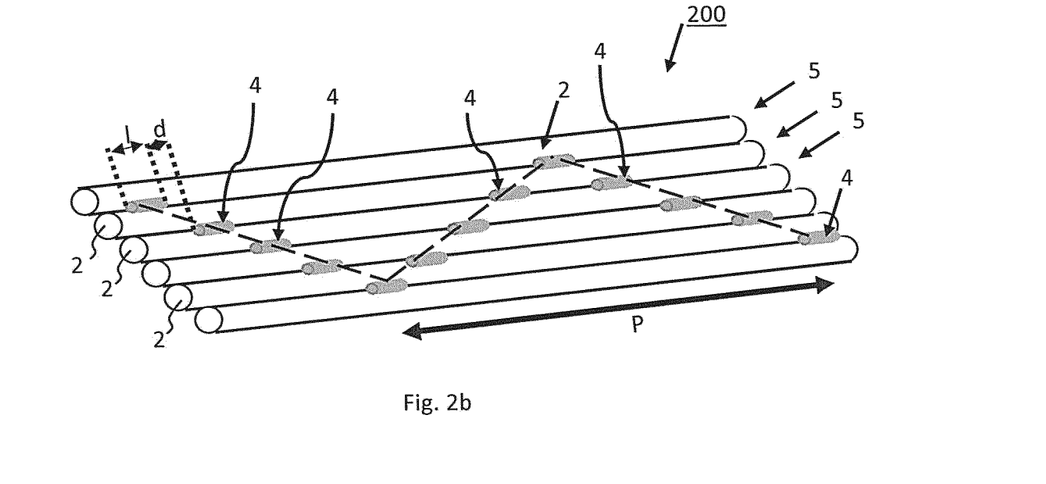

FIG. 2a discloses a first embodiment of an optical fiber ribbon 100 having a zig-zag like arrangement. In this arrangement none of the beads 4 are connected and the plurality of beads is arranged as a discontinuous line. FIG. 2b discloses a second embodiment of an optical fiber ribbon 200 having a zig-zag like arrangement (which arrangement is shown by the black striped line connecting the middle points of the beads). The difference with FIG. 2a being that the bonding length l is shorter. In this arrangement none of the beads 4 are connected and the plurality of beads is arranged as a discontinuous line.

Figure 3:
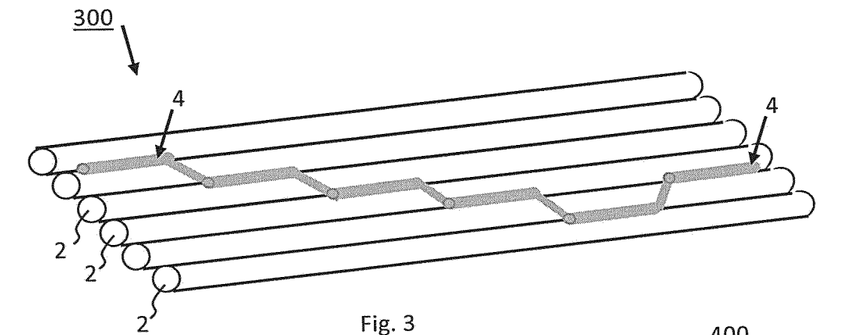
FIG. 3 shows an embodiment of an inventive optical fiber ribbon having an continuous zig-zag like arrangement, in 3-dimensional view.

FIG. 3 discloses a third embodiment of an optical fiber ribbon 300 having a zig-zag like arrangement. The plurality of beads 4 are arranged as a continuous line of said bonding material, in the same manner as is the case in FIG. 6, so having the transition parts 9, 9'. The zig-zag like arrangement of the embodiments according FIGS. 2a, 2b and 3 has a constant repeated arrangement that follows the trace of a triangle wave with a pitch (P) as shown in FIG. 2b.

In an embodiment, the bonding material has a elongation at break of at least 150%, preferably at least 175%, more preferably at least 200%, even more preferably at least 220% and an modulus of elasticity (or Young's modulus) of between 10 and 16 MPa. In the present invention elongation at break and modulus of elasticity was measured using the following method: ASTM D882-12 "Standard Test Method for Tensile Properties of Thin Plastic Sheeting".

In an embodiment the bonding material is a cured resin or a thermoplastic material.

In an embodiment, the cured resin is an acrylate resin. Said cured resin is obtained by the curing of a curable, preferably UV curable resin, that is applied in the form of beads on the optical fiber assembly.

In an embodiment, the thermoplastic material is selected from the group consisting of nylon, copolyamide, polyester and copolyester.

In an embodiment, the thermoplastic material has a melting point of between 55 and 170° C., such as between 60 and 150° C., for example between 120 and 150° C.

In an embodiment, W is between 2 and 10 mm, preferably between 2 and 4 mm. The width W is effectively formed by the number (N) of optical fiber units each having a unit width (w) (W=w×N). In case that the optical fiber units comprise a single fiber, the unit with equals the fiber diameter (D) so that W=D×N.

In an embodiment, at a certain longitudinal position over the width (W) of the optical fiber assembly there is one bond. In an embodiment, at each longitudinal position over the width (W) of the optical fiber assembly there is one bond. In other words, at one certain longitudinal position there is only a bond between two optical fiber units, there is no bond present between another set of two adjacent optical fiber units. This structure minimizes the amount of bonds required and allows maximum flexibility.

Figure 10:
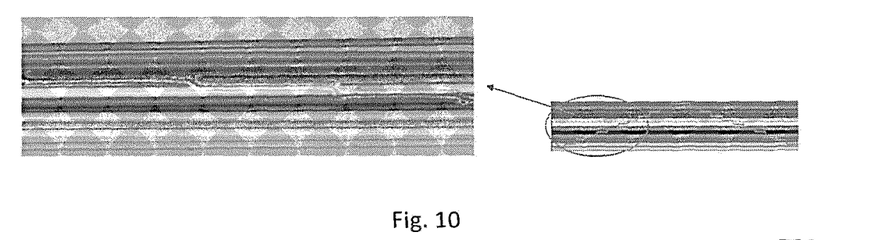
FIG. 10 shows a picture of ribbon according to an embodiment of the present invention, in plan view.

FIG. 10 shows a picture of a ribbon according to the present invention having a zig-zag like arrangement with a continuous line of a cured resin.

The cross-section of FIG. 12 relates to a ribbon 700 according to the present invention, having fiber units 105 of each time a group of two optical fibers 2, encapsulated with a matrix material 8. Successive elongated rectilinear beads 4 of a bonding material have been arranged along a length of said assembly (one bead 4 is shown in the cross section). Each of said plurality of beads forms an elongated bond between two adjacent optical fiber units 105 as shown in FIG. 12.

Figure 11:
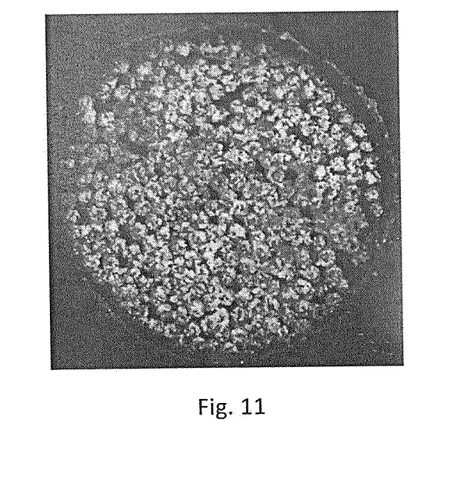
FIG. 11 shows, in cross-sectional view, a picture of an optical cable unit being prepared using 24 optical fiber ribbons each having 12 optical fibers.

The optical fiber ribbon of the present invention may be used to form optical fiber cable units and optical fiber cables. An example of such an optical fiber cable unit is shown in FIG. 11, this unit has 24 ribbons of 12 optical fibers. This cable unit packs 288 optical fibers in a very high fiber density.

In an aspect, the present invention relates to an optical fiber cable unit comprising one or more optical fiber ribbons according to the present invention surrounded by a polymeric sheath. In another aspect, the present invention also relates to an optical fiber cable comprising one or more of the optical fiber ribbons or optical fiber cable units according to the present invention.

In a second aspect, the present invention relates to a method of producing an optical fiber ribbon 100-700.

In a first step, a plurality of fiber units 5, 105, that is individual optical fibers 2, or grouped optical fibers 2, are fed—preferably into a die 12—to provide a longitudinal optical fiber assembly 3 wherein the plurality of optical fibers, or grouped optical fibers are in parallel and adjacent to each other. This is visible from FIG. 7 (process from right to left) and the assembly 3 is shown in FIG. 1.

In a second step, a bonding material is applied from a dispenser (or dispensing device) 14 to a surface, such as an upper surface of said assembly. Said second step may be in the form of applying a curable—preferably UV curable—resin. The application of said resin leads to said resin forming a stepwise pattern of a plurality of intermittently arranged beads 4 along the upper surface of said assembly 3. The second step may also be carried out by providing a thread of a thermoplastic material from the dispenser and heating said thermoplastic thread to above its softening point and applying said softened thermoplastic thread to said surface of said assembly 3 wherein the softened thermoplastic material is cooled down and forms a plurality of successive elongated rectilinear beads being configured to from bonds of said thermoplastic material.

Figure 7:
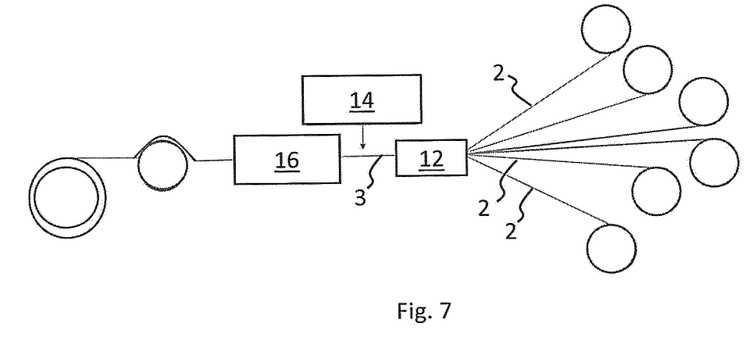
FIG. 7 shows a schematic representation of a possible process line for preparing an optical fiber ribbon having six optical fibers.

In a third step which is present in the case of using a curable resin as bonding material—also shown in FIG. 7—said assembly with beads applied thereon is passed through a curing station 16 for curing the resin of said beads to form a stepwise pattern of successive bonds.

In this method, each of said beads being arranged to form a bond between two adjacent optical fibers units over a bonding length (l); and moreover, a bond connects two adjacent optical fibers units and a successive bond connects two adjacent optical fibers units at least one of which differs from the optical fibers units bonded by the preceding bond; and moreover, each of said bonds being distanced in longitudinal direction from a successive bond by a bonding distance (d). In an embodiment, the bonding length is larger than the bonding distance (l>d).

Figure 8:
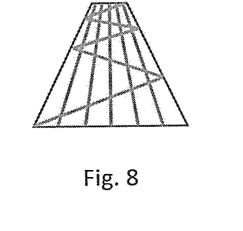
FIG. 8 shows a schematic representation of an optical fiber ribbon having a zig-zag like arrangement, in perspective view.
Figure 9:
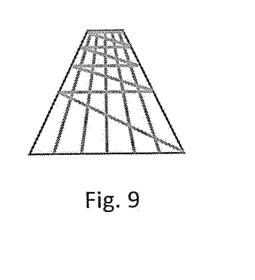
FIG. 9 shows a schematic representation of an optical fiber ribbon having a saw-tooth like arrangement, in perspective view.

FIG. 8 shows a schematic drawing of an optical fiber ribbon having six optical fibers and a zig-zag stepwise arrangement of resin. FIG. 9 shows a schematic drawing of an optical fiber ribbon having six optical fibers and a saw-tooth stepwise arrangement of resin.

In a first embodiment of said method, said *applying a bonding material from a dispenser to a surface; comprises (or consist of) the following steps: *applying a curable resin from the dispenser to the surface of said assembly wherein the resin forms the plurality of successive elongated rectilinear beads being configured to from bonds; and *passing said assembly with the beads applied thereon through a curing station for curing the resin of said beads to form said bonds of cured resin.

In a second embodiment of said method, said *applying a bonding material from a dispenser to a surface; comprises (or consist of) the following step: *providing a thread of a thermoplastic material from the dispenser and heating said thermoplastic thread to above its softening point and applying said softened thermoplastic thread to said surface of said assembly wherein the softened thermoplastic material is cooled down and forms a plurality of successive elongated rectilinear beads being configured to from bonds of said thermoplastic material.

In an embodiment, the dispenser (dispensing device) is oscillating in a direction transverse to the longitudinal direction of the optical fiber assembly. Said oscillating device creates the stepwise pattern on one side of the optical fiber assembly; the tip of said dispenser may oscillate (vibrate) at a high frequency, such as in the order of between 100 and 200 Hz in a transverse direction. In an embodiment, the dispenser is oscillating in a direction transverse to the longitudinal direction (i.e. in the width direction) of the optical fiber assembly. The optical fiber assembly is moved in longitudinal directly, preferably by reels.

In an embodiment the dispenser may deliver the liquid resin in fine droplets to the moving optical fiber assembly. Due to the surface tension of liquid resin it will flow together to form elongated beads.

In an embodiment, the curable resin has a viscosity at 23° C. of between 200 and 2000 cPS, preferably between 300 and 1000 cPS and more preferably between 400 and 600 cPS. The viscosity is measured at 23° C. using a Brookfield digital rotational viscometer Model DV-II with RV1 spindle at 10 rpm.

In an embodiment, the curing station emits UV or Electron Beam (EB) radiation for curing said beads of curable resin.

Alternatively in the second step the bonding material is applied from a dispersing device as a thermoplastic thread and heated to above its softening point. Preferably the softening point of said thermoplastic thread is above 120° C. The softening point is determined according Vicat method with a load of 10N, according ASTM-D1525-09. After heating the thermoplastic thread is cooled down, e.g. by transporting the fiber assembly over cold sheaves.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The scope of the present invention is defined by the appended claims. One or more of the objects of the invention are achieved by the appended claims.

The invention claimed is:
1. An optical fiber ribbon, comprising:
(i) a plurality of adjacent optical fiber units extending in a longitudinal direction and arranged in parallel to form an optical fiber assembly having a width, each of the optical fiber units comprising either a single optical fiber or a group of at most three optical fibers encapsulated with a matrix material; and
(ii) a plurality of successive elongated rectilinear beads of a bonding material being arranged along a length of said optical fiber assembly, each of said plurality of beads being configured to form an elongated bond between two adjacent optical fiber units of the plurality of optical fiber units, wherein a first bead forming a first bond connects a first pair of adjacent optical fiber units while a successive bond formed by a successive bead connects a further pair of adjacent optical fiber units, wherein at least one optical fiber unit of the further pair differs from the optical fiber units of the first pair;
wherein at each longitudinal position of the optical fiber assembly there is at most one bond; and
wherein two successive beads of said plurality of beads are connected by a transition part of said bonding material.

2. The optical fiber ribbon according to claim 1, wherein:
said first bond has a bonding length (l);
said first bond and said successive bond are spaced apart in longitudinal direction by a distance (d); and
the bonding length (l) is between 2 and 20 times the distance (d).

3. The optical fiber ribbon according to claim 1, wherein said beads are arranged on only one side of said optical fiber assembly.

4. The optical fiber ribbon according to claim 1, wherein a succession of alternating beads and transition parts forms a thread, wherein at each longitudinal position of the optical fiber assembly there is at most one thread.

5. The optical fiber ribbon according to claim 1, wherein a number of successive beads form a stepwise pattern over the plurality of optical fiber units, the step each time being one optical fiber unit.

6. The optical fiber ribbon according to claim 5, wherein at an end of said stepwise pattern of beads, the bead that follows the last bead of said pattern starts a subsequent stepwise pattern in a same width direction.

7. The optical fiber ribbon according to claim 5, wherein a first stepwise pattern is formed in a first width direction and wherein at the end of said stepwise pattern a further stepwise pattern in the opposite direction is formed.

8. The optical fiber ribbon according to claim 1, wherein the bonding material has an elongation at break of at least 150 percent and a modulus of elasticity of between 10 and 16 MPa.

9. The optical fiber ribbon according to claim 1, wherein the bonding material is a cured resin or a thermoplastic material.

10. The optical fiber ribbon according to claim 1, wherein said beads have respective bonding lengths (l) between 1.5 and 20 mm.

11. An optical fiber ribbon, comprising:
(i) a plurality of adjacent optical fiber units extending in a longitudinal direction and arranged in parallel to form an optical fiber assembly having a width, each of the optical fiber units comprising either a single optical fiber or a group of at most three optical fibers encapsulated with a matrix material; and (ii) a plurality of successive elongated rectilinear beads of a bonding material being arranged along a length of said optical fiber assembly, each of said plurality of beads being configured to form an elongated bond between two adjacent optical fiber units of the plurality of optical fiber units, wherein a first bead forming a first bond connects a first pair of adjacent optical fiber units while a successive bond formed by a successive bead connects a further pair of adjacent optical fiber units, wherein at least one optical fiber unit of the further pair differs from the optical fiber units of the first pair;

wherein at each longitudinal position of the optical fiber assembly there is at most one bond;

wherein a number of successive beads form a stepwise pattern over the plurality of optical fiber units, the step each time being one optical fiber unit;

wherein at an end of said stepwise pattern of beads, the bead that follows the last bead of said pattern starts a subsequent stepwise pattern in a same width direction; and wherein a pitch (P) is defined as having a length equal to the recurrence of the stepwise pattern in the same width direction and wherein the pitch (P) has a length that is between 10 times and 100 times the width of the optical fiber assembly (W).

12. The optical fiber ribbon according to claim 11, wherein:
said first bond has a bonding length (l);
said first bond and said successive bond are spaced apart in longitudinal direction by a distance (d); and
the bonding length (l) is between 2 and 20 times the distance (d).

13. The optical fiber ribbon according to claim 11, wherein said beads are arranged on only one side of said optical fiber assembly.

14. The optical fiber ribbon according to claim 11, wherein two successive beads of said plurality of beads are connected by a transition part of said bonding material.

15. The optical fiber ribbon according to claim 11, wherein each two successive beads of said plurality of beads are free from each other in that no bonding material connects said two successive beads.

16. An optical fiber ribbon, comprising:
(i) a plurality of adjacent optical fiber units extending in a longitudinal direction and arranged in parallel to form an optical fiber assembly having a width, each of the optical fiber units comprising either a single optical fiber or a group of at most three optical fibers encapsulated with a matrix material; and
(ii) a plurality of successive elongated rectilinear beads of a bonding material being arranged along a length of said optical fiber assembly, each of said plurality of beads being configured to form an elongated bond between two adjacent optical fiber units of the plurality of optical fiber units, wherein a first bead forming a first bond connects a first pair of adjacent optical fiber units while a successive bond formed by a successive bead connects a further pair of adjacent optical fiber units, wherein at least one optical fiber unit of the further pair differs from the optical fiber units of the first pair;

wherein at each longitudinal position of the optical fiber assembly there is at most one bond;

wherein a number of successive beads form a stepwise pattern over the plurality of optical fiber units, the step each time being one optical fiber unit;

wherein a first stepwise pattern is formed in a first width direction and wherein at the end of said stepwise pattern a further stepwise pattern in an opposite second width direction is formed; and wherein a pitch (P) is defined as having a length equal to the recurrence of the stepwise pattern in the same width direction and wherein the pitch (P) has a length that is between 14 times and 140 times the width of the optical fiber assembly (W).

17. The optical fiber ribbon according to claim 16, wherein:
said first bond has a bonding length (l);
said first bond and said successive bond are spaced apart in longitudinal direction by a distance (d); and
the bonding length (l) is between 2 and 20 times the distance (d).

18. The optical fiber ribbon according to claim 16, wherein said beads are arranged on only one side of said optical fiber assembly.

19. The optical fiber ribbon according to claim 16, wherein two successive beads of said plurality of beads are connected by a transition part of said bonding material.

20. The optical fiber ribbon according to claim 16, wherein each two successive beads of said plurality of beads are free from each other in that no bonding material connects said two successive beads.

* * * * *